United States Patent
Agarwal et al.

(10) Patent No.: US 8,990,515 B2
(45) Date of Patent: Mar. 24, 2015

(54) ALIASING BUFFERS

(75) Inventors: Amit Kumar Agarwal, Bellevue, WA (US); Weirong Zhu, Issaquah, WA (US); Yosseff Levanoni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 941 days.

(21) Appl. No.: 13/160,373

(22) Filed: Jun. 14, 2011

(65) Prior Publication Data

US 2012/0324430 A1 Dec. 20, 2012

(51) Int. Cl.
G06F 9/45 (2006.01)
G06F 9/445 (2006.01)

(52) U.S. Cl.
CPC .............. *G06F 8/51* (2013.01); *G06F 9/44536* (2013.01)
USPC ............ 711/149; 717/140; 717/141; 717/136

(58) Field of Classification Search
None
See application file for complete search history.

(56) References Cited

U.S. PATENT DOCUMENTS

| | | | |
|---|---|---|---|
| 5,339,419 A | 8/1994 | Kolb | |
| 5,339,430 A | 8/1994 | Lundin | |
| 6,665,865 B1 | 12/2003 | Ruf | |
| 6,748,587 B1 | 6/2004 | Santhanam et al. | |
| 6,961,840 B2 | 11/2005 | Fleming | |
| 7,463,259 B1 | 12/2008 | Kolb | |
| 7,793,272 B2 | 9/2010 | Andrews et al. | |
| 2004/0221278 A1 | 11/2004 | Dankel et al. | |
| 2004/0221280 A1 | 11/2004 | Bolton et al. | |
| 2006/0206880 A1 | 9/2006 | Barraclough et al. | |
| 2006/0230223 A1* | 10/2006 | Kruger et al. | 711/6 |
| 2006/0277532 A1 | 12/2006 | Barraclough et al. | |
| 2007/0006184 A1 | 1/2007 | Andrews et al. | |
| 2007/0288721 A1 | 12/2007 | Kruger et al. | |
| 2008/0276261 A1 | 11/2008 | Munshi et al. | |
| 2008/0276262 A1* | 11/2008 | Munshi et al. | 717/140 |
| 2009/0024986 A1 | 1/2009 | Meijer | |
| 2009/0070753 A1 | 3/2009 | Chen | |
| 2009/0100416 A1 | 4/2009 | Brown et al. | |
| 2009/0300590 A1 | 12/2009 | Moritz | |
| 2009/0328013 A1 | 12/2009 | Aharoni et al. | |
| 2010/0026692 A1 | 2/2010 | Lew et al. | |
| 2010/0299658 A1 | 11/2010 | Ng et al. | |

(Continued)

OTHER PUBLICATIONS

Xiaohua Shi, "Design a High-Performance Just-in-Time Compiler for a J@ME JVM on", School of Computer Science Beihang University, Jul. 2008, 8 pages, <http://ieeexplore.ieee.org/stamp/stamp.jsp?tp=&arnumber=4595594>.

(Continued)

*Primary Examiner* — Qamrun Nahar
(74) *Attorney, Agent, or Firm* — Kevin Sullivan; Brian Haslam; Micky Minhas

(57) ABSTRACT

The present invention extends to methods, systems, and computer program products for aliasing buffers. Embodiment of the inventions supporting buffer aliasing through introduction of a level of indirection between a source program's buffer accesses and the target executable physical buffers, and binding the logical buffer accesses to actual physical buffer accesses at runtime. A variety of techniques for can be used supporting runtime aliasing of buffers, in a system which otherwise disallows such runtime aliasing between separately defined buffers in the target executable code. Binding of logical buffer accesses in the source program to the actual physical buffers defined in the target executable code is delayed until runtime.

20 Claims, 4 Drawing Sheets

(56) References Cited

U.S. PATENT DOCUMENTS

2010/0299660 A1   11/2010   Torgersen
2012/0317558 A1   12/2012   Agarwal

OTHER PUBLICATIONS

Ung, D., "Dynamic re-engineering of binary code with run-time feedbacks", University of Queesnland, QLD, Australia, Nov. 2000, 9 pages, <http://ieeecplore.ieee.org/stamp/stamp.jsp.?tp=&arnumber=891447>.

Mikyung Kang, "Design and Development of a Run-time Monitor for Multi-Core Architectures in Cloud Computing", Information Sciences Institute (ISI), Mar. 2011, 16 pages, <http://ip.com/pdf/pmc/PMC3231313.pdf>.

Joseph P. Loyall, "QoS Aspect Languages and their Runtime Integration", BBN Technologies, 1998, 16 pages, (The month of Publication is irrelevant since the year of Publication is clearly prior to the filing of the Application) <http://www.dist-systems/bbn/com>.

Notice of Allowance dated Feb. 14, 2013 cited in U.S. Appl. No. 13/158,226.

Gorbovitski, Michael, et al., "Alias Analysis for Optimization of Dynamic Languages", Oct. 2010, 15 pages.

Horwitz, Susan, "Precise Flow-Insensitive May-Alias Analysis is NP-Hard", ACM Transactions on Programming Languages and Systems, vol. 19, No. 1, Jan. 1997, pp. 1-6.

Robison, Arch D., "Impact of Economics on Compiler Optimization", Based on information and belief available, at least as early as Jan. 6, 2011, 10 pages.

Meier, J.D., et al., "Chapter 5—Improving Managed Code Performance", May 2004, 42 pages.

Poletto, Massimiliano, et al., "'C and tcc: A Language and Compiler for Dynamic Code Generation", Oct. 1997, 47 pages.

Clarberg, Petrik, et al., "An Optimizing Compiler for Automatic Shader Bounding", 2010, 10 pages.

Hargreaves, Shawn, "Generating Shaders From HLSL Fragments", Based on information and belief available, at least as early as Jan. 3, 2011, 12 pages.

Parker, Steven G., et al., "RTSL: a Ray Tracing Shading Language", IEEE/EG Symposium on Interactive Ray Tracing 2007, pp. 149-160.

Apple Computer, Inc., "Framework Programming Guide", Nov. 7, 2006, 58 pages.

* cited by examiner

200

201
Accessing A Program, The Program Including Source Code Of A Programming Language, The Source Code Configured For Mixed Execution On The First Processor Type And The Second Different Processor Type, The Source Code Defining One Or More Physical Buffers, The Source Code Also Including Instructions For Logically Accessing The One Or More Physical Buffers Through A Plurality Of Logical Views, Each Logical View Corresponding To A Subset Of Data In The Physical Buffer, At Least One Portion Of The Source Code Targeted For The Second Different Processor Type

202
Converting The At Least One Portion Of Source Code Into Second Code For The Second Different Processor Type, The Second Code Defining A Level Of Indirection Between The Logical Buffer Access And The Underlying Physical Buffer Access

203
Configuring Execution Of The Second Code Within The Runtime Environment Of The Second Different Processor Type To Bind Logical Buffer Access To The Physical Buffer Using The Defined Level Of Indirection

204
Using The Defined Level Of Indirection To Bind The Logical Buffer Access To The Physical Buffer During Execution Of The Second Code

*Figure 2*

(Dynamic Field Buffer Mapping Tags)

(Abstract Interfaces And Dynamic Linking)

ALIASING BUFFERS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Some runtime environments use buffer aliasing to provide a programming abstraction. Buffer aliasing abstracts one or more physical buffers into logical buffers that each represents a subset of an underlying physical buffer. Buffer aliasing enables programmers to develop algorithms without concern of whether buffers that are passed as (e.g., input or output) parameters to an algorithm belong to different or the same physical buffers.

However, other runtime environments disallow runtime buffer aliasing between separately defined buffers. In these environments, buffer access is made through reference to the underlying physical buffers.

Further, it may be that portions of software developed for one runtime environment are ultimately executed in a different runtime environment, such as, for example, in multi-processor environments having different types of processors. Thus, a portion of code including buffer aliasing instructions can be developed for execution in a first runtime environment (e.g., on a general purpose Central Processing Unit ("CPU")) that supports buffer aliasing. However at runtime, the portion of code can be allocated to for example at a second different runtime environment (e.g., a Graphical Processing Unit ("GPU")) that disallows buffer aliasing. The second runtime environment does not know how to execute the buffer aliasing instructions. Thus, upon encountering the buffer aliasing instructions, the second runtime environment can cause the portion of code to stop working as intended, can cause an exception, or can cause some other type of error.

BRIEF SUMMARY

The present invention extends to methods, systems, and computer program products for aliasing buffers. A computer system includes a plurality of processors including a first processor type and a second different processor type. The runtime environment for the second processor type disallows aliasing of physical buffers.

The computer system accesses a program. The program includes source code of a programming language. The source code is configured for mixed execution on the first processor type and the second processor type, with at least one portion of the source code targeted for the second processor type. The source code defines one or more physical buffers and includes instructions for logically accessing the one or more physical buffers through a plurality of logical views. Each logical view corresponds to a subset of data in a physical buffer.

At least one portion of source code is converted into second code for the second different processor type. The second code defines a level of indirection between the logical buffer access and the underlying physical buffer access. Execution of the second code is configured within the runtime environment of the second different processor type to bind logical buffer access to the physical buffer using the defined level of indirection. The defined level of indirection is used to bind the logical buffer access to the physical buffer during execution of the second code.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow chart of an example method for aliasing buffers.

DETAILED DESCRIPTION

Figure 1:
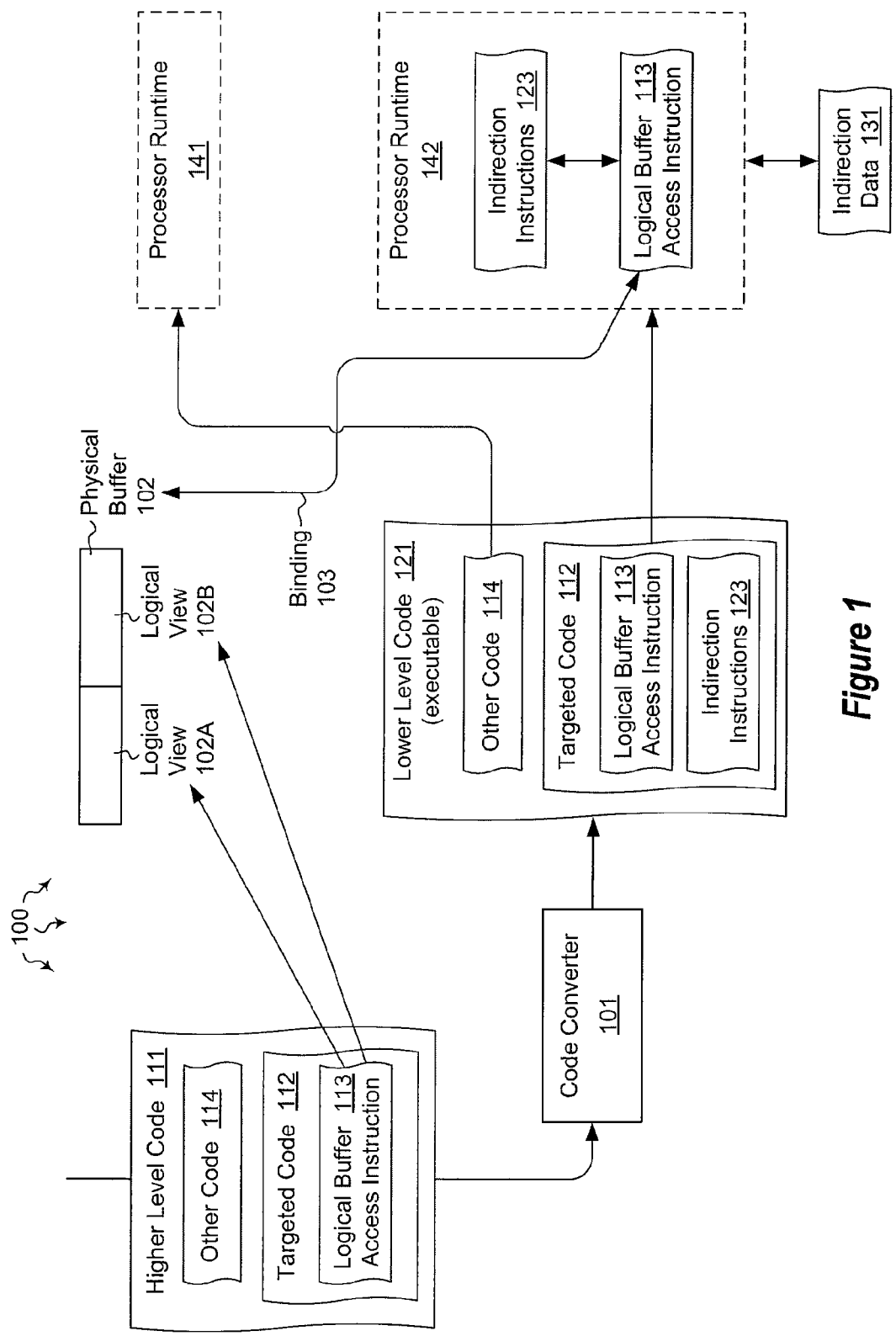
FIG. 1 illustrates an example computer architecture that facilitates aliasing buffers.

The present invention extends to methods, systems, and computer program products for aliasing buffers. A computer system includes a plurality of processors including a first processor type and a second different processor type. The runtime environment for the second processor type disallows aliasing of physical buffers. The computer system accesses a program. The program includes source code of a programming language. The source code is configured for mixed execution on the first processor type and the second processor type, with at least one portion of the source code targeted for the second processor type. The source code defines one or more physical buffers and includes instructions for logically accessing the one or more physical buffers through a plurality of logical views. Each logical view corresponds to a subset of data in a physical buffer.

At least one portion of source code is converted into second code for the second different processor type. The second code defines a level of indirection between the logical buffer access and the underlying physical buffer access. Execution of the second code is configured within the runtime environment of the second different processor type to bind logical buffer access to the physical buffer using the defined level of indirection. The defined level of indirection is used to bind the logical buffer access to the physical buffer during execution of the second code.

Embodiments of the invention include various mechanisms for providing a level of indirection. In some embodiments, dynamic tags are used to provide a level of indirection. Dynamic tags can be included in generated executable code (e.g., the second code) for multiplexing logical buffer access to appropriate physical buffer access. In other embodiments, abstract interfaces and dynamic linking are used to provide a level of indirection. Abstract interfaces are included in generated executable code (e.g., the second code) for logical buffer access. At runtime, the executable code is dynamically linked to appropriate physical buffer access.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed on a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including combinations having one or more of: personal computers, desktop computers, laptop computers, message processors, hand-held devices, multi-processor systems (including systems with a one or more Central Processing Units ("CPUs") and one or more co-processors, for example, Graphical Processing Units ("GPUs") or accelerators), microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates aliasing buffers. Referring to FIG. 1, computer architecture 100 includes code converter 101, physical buffer 102, processor runtime 141 and processor runtime 142. Each of the depicted components is connected to one another over (or is part of) a system bus and/or a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

In general, code converter 101 is configured to convert code to include indirection instructions that facilitate buffer aliasing in a processor runtime that otherwise disallows buffer aliasing between separately defined buffers. In some embodiments, indirection instructions including dynamic tags for multiplexing logical buffer access to actual physical buffers. In other embodiments, indirection instructions include abstract interfaces for logical buffer access. The abstract interfaces are dynamically linked to physical buffer access at runtime.

Physical buffer 102 can be a system memory location (e.g., a portion of RAM), a virtual memory location (e.g., on disk)

within computer architecture 100, or a memory location in specialized memory accessible to the second different processor type.

Computer architecture 100 can include a plurality of processor runtimes including processor runtime 141 and processor runtime 142. Each processor runtime can correspond to a different processor, such as, for example, a general purpose processor (e.g., a Central Processing Unit ("CPU")) or a special purpose processor (e.g., a Graphical Processing Unit ("GPU")). Each processor runtime can be configured with various (and different) properties used when code is executed. For example, some processor runtimes natively support buffer aliasing, while other processor runtimes disallow buffer aliasing.

For example, C++ extended for parallel environments provides an abstraction of a device buffer in the form of an "array" or "array_view" type. Instances of "array" or "array_view" types are inputs and outputs of the code to be executed on a device and can be passed as parameters to the device code at runtime. Each array or array_view instance can provide access to a subset of an actual underlying physical buffer resource (e.g., DirectX® buffer resource when targeting to DirectX®). When generating executable code for a C++ extended for parallel environments kernel function, a compiler defines buffer variables for each array or array_view parameter to the kernel in the generated executable code.

It may be that portions of the C++ extended for parallel environments code are translated into High Level Shader Language ("HLSL") for execution on a GPU. For example, C++ extended for parallel environments can be targeted to a DirectX®/HLSL platform. Thus, C++ extended for parallel environments array or array_view access can be directly translated into a corresponding High Level Shader Language ("HLSL") buffer access. However, DirectX® disallows buffer aliasing. As such, binding the same DirectX® buffer resource to multiple HLSL buffer variables is also disallowed. Thus, users are essentially unable to pass array or array_view instances with the same underlying DirectX® buffer resource as actual parameters to the C++ extended for parallel environments kernel at runtime.

FIG. 2 illustrates a flow chart of an example method 200 for aliasing buffers. Method 200 will be described with respect to the components and data of computer architecture 100.

Method 200 includes an act of accessing a program, the program including source code of a programming language, the source code configured for mixed execution on the first processor type and the second different processor type, the source code defining an array or array_view (a logical view of data) that maps to a physical buffer, the source code also including instructions for logically accessing the physical buffer through a plurality of logical views, each logical view corresponding to a subset of data in the physical buffer, at least one portion of the source code targeted for the second different processor type (act 201). For example, code converter 101 can access higher level code 111. Higher level code 111 can be configured for mixed execution in processor runtime 141 (e.g., a CPU environment supporting buffer aliasing) and in processor runtime 142 (e.g., a GPU environment disallowing buffer aliasing). For example, other code 114 can be designated for execution in processor runtime 141 and targeted code 112 can be designated for execution in processor runtime 142. Higher level code 111 can define physical buffer 102. Logical buffer access instructions 113 abstract access to physical buffer 102 through logical views 102A and 102B.

Method 200 includes an act of converting the at least one portion of source code into second code for the second different processor type, the second code defining a level of indirection between the logical buffer access and the physical buffer (act 202). For example, code converter 101 can convert targeted code 112 to include indirection instructions 123. Indirection instructions 123 can define a level of indirection between logical buffer views 102A and 102B and physical buffer 102.

Method 200 includes an act of configuring execution of the second code within the runtime environment of the second different processor type to bind logical buffer access to the physical buffer using the defined level of indirection (act 203). During execution of lower level code 121, targeted code 112 can be passed to processor runtime 142. Processor runtime 142 can configure execution of targeted code to bind logical buffer access 113 to physical buffer 102 using indirection instructions 123. Processor runtime 142 can analyze logical buffer access instructions 113 to determine physical buffers (e.g., 102) that are accessed through logical views (e.g., 102A, and 102B). Processor runtime 142 can generate indirection data 131 to assist indirection instructions in simulating buffer aliasing.

Method 200 includes an act of using the defined level of indirection to bind the logical buffer access to the physical buffer during execution of the second code (act 204). For example, processor runtime 142 can used indirection instructions 123 to bind 103 logical buffer access 113 to physical buffer 102 during execution of targeted code 112. Indirection instructions 123 can refer to indirection data 131 to map logical views 102A and 102B to corresponding locations within physical buffer 102.

Various different techniques can be employed by a (e.g., C++ extended for parallel environments) compiler and runtime to facilitate buffer aliasing that is otherwise disallowed. For example, techniques can be used to enable programmers of C++ extended for parallel environments to pass array or array_view instances with same underlying physical DirectX® buffer resource as parameters to a C++ extended for parallel environments kernel, even if one or more of the kernel parameters are declared as writable. As described, aliasing of array or array_view instances can be achieved by introducing a level of indirection between the source array's or source array_view's buffer accesses and the underlying HLSL buffer accesses in the generated executable code. Actual binding of an array or array_view access to the appropriate HLSL buffer variable happens at runtime.

Figure 3A:
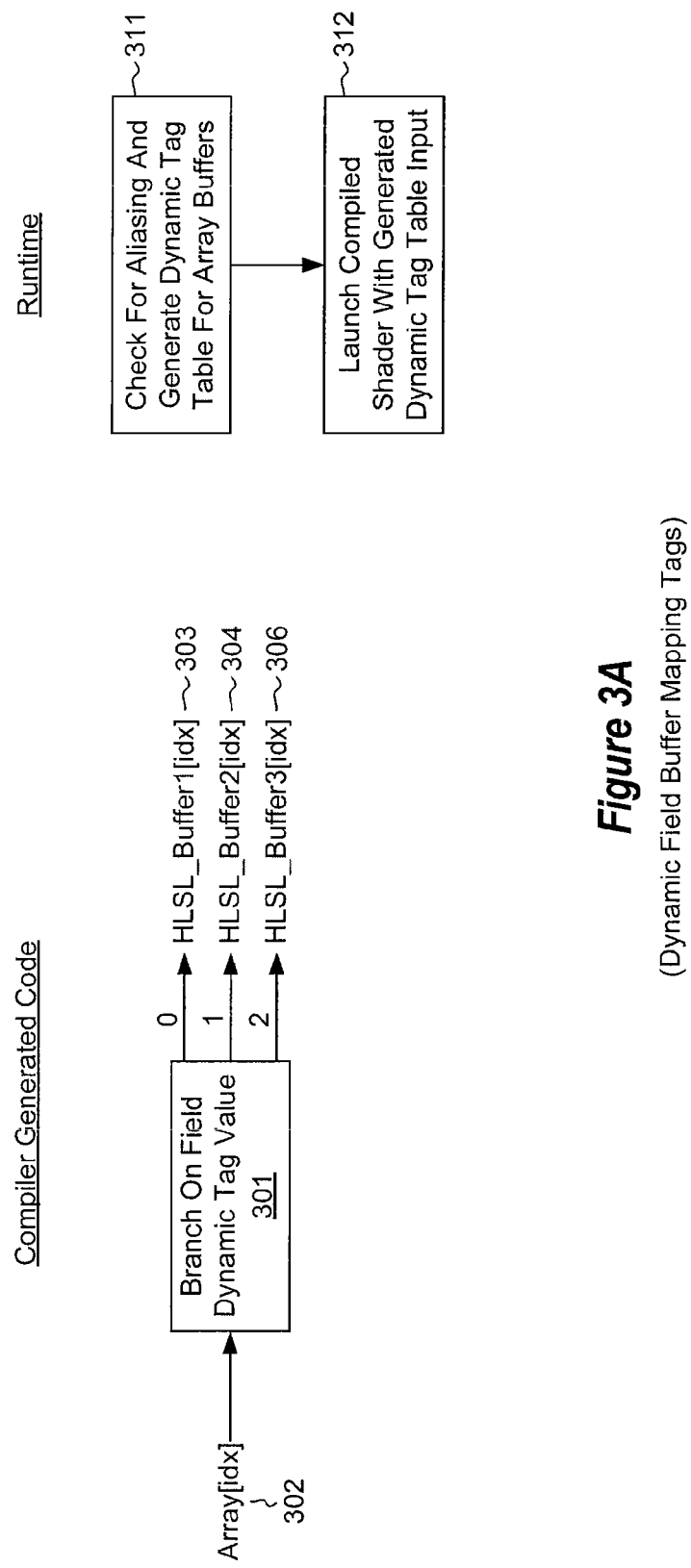
FIG. 3A illustrates using dynamic tags to provide a level on indirection

One technique for implementing indirection is the use of dynamic tags. FIG. 3A illustrates using dynamic tags for a level of indirection. Complier generated code can include branch code 301. When array 302 is received, the branch code can execute on a dynamic tag value to select one of buffers 303, 304, and 306. During runtime, input logical views are checked for aliasing and each logical view is assigned a dynamic tag value to redirect the logical view accesses in the share to the appropriate physical buffer (311). A compiled shader is launched with generated dynamic tag value input (312).

For example, the following program (e.g., higher level code 111) includes buffer aliasing:

```
void device_kernel(index<1> idx, array<int, 1> f1, array<int, 1> f2)
{
    f2[idx] = f1[idx] + 5;
}
void main( )
{
    array<int, 1> f1(inputData);
    ...
    device_kernel(f1, f1);
}
```

Using dynamic tags, a compiler (e.g., code converter 121) defines a HLSL buffer variable corresponding to each array parameter of the source kernel. The bindings between the array buffer and the actual HLSL buffer that it maps to, are read from a dynamic tag table (generated from analysis of prior code) passed to the compiled HLSL code at runtime. The dynamic tag table contains the mapping between the C++ extended for parallel environments array's buffers and the corresponding HLSL buffer variables. For each array access, the compiler generates a switch statement on the dynamic tag value for that array, with a case statement for each of the HLSL buffer variables defined in the generated code.

From the example program, a compiler can generate code that uses dynamic tags for indirection. For example, a compiler can generate the following code from the example program:

```
array_to_hlsl_buffer_map tag_table[numArrays];
HLSL_buffer buf1, buf2; // One HLSL buffer variable declared for each
array parameter
int temp1;
switch (tag_table[f1])
{
case 0: // Index 0 corresponds to HLSL buffer1
    temp1 = buf1[idx];
    break;
case 1: // Index 1 corresponds to HLSL buffer2
    temp1 = buf2[idx];
    break;
}
int temp2 = temp1 + 5;
switch (tag_table[f2])
{
case 0: // Index 0 corresponds to HLSL buffer1
    buf1[idx] = temp2;
    break;
case 1: // Index 1 corresponds to HLSL buffer2
    buf2[idx] = temp2;
    break;
}
```

The runtime (e.g., processor runtime 142) populates the dynamic tag table by checking each actual array/array_view or parameter for read-write aliasing with other array/array_view parameters passed to the kernel at runtime. If aliasing is detected for that array/array_view, one of the writable arrays/array_views is picked from among the aliases and the corresponding HLSL buffer variable is bound to the DirectX® buffer underlying the aliased arrays/array_views. Entries for each of the aliased arrays/array_views in the array to HLSL buffer map are set to the index (integer ID) of the HLSL buffer variable bound to the DirectX® buffer resource. The HLSL buffer variables corresponding to all the other aliased arrays/array_views are bound to NULL.

For the example program the table generated is:
Array "f1"→0 (Index of 1$^{st}$ HLSL buffer variable)
Array "f2"→0 (Index of 1$^{st}$ HLSL buffer variable)

Figure 3B:
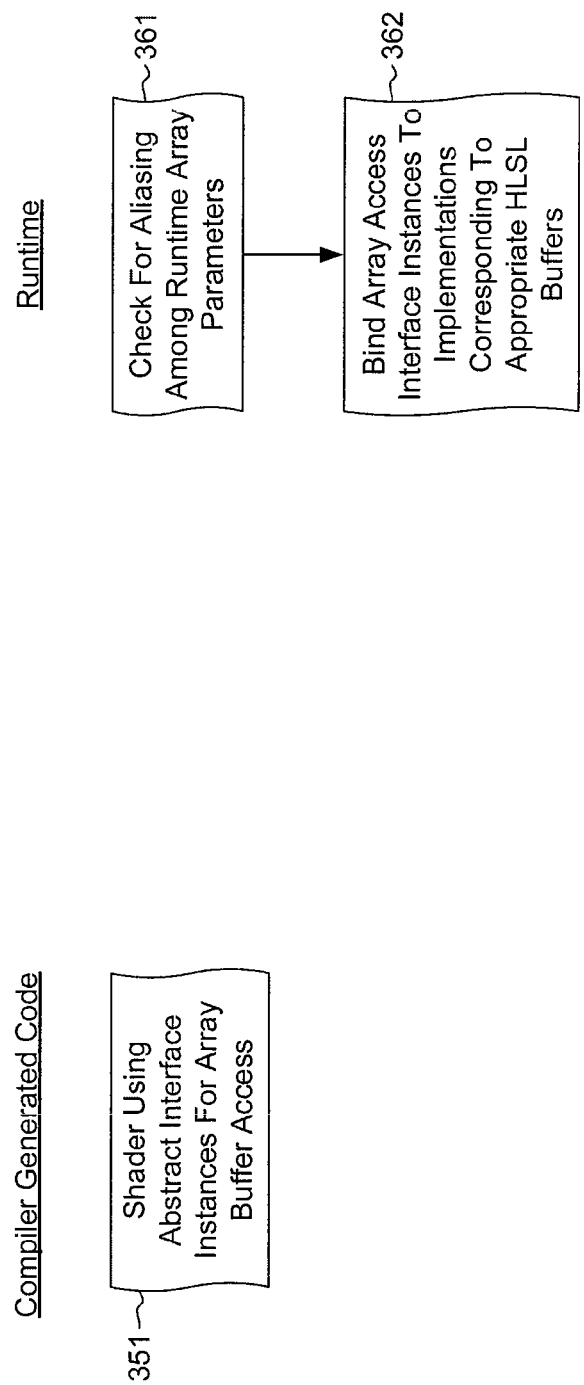
FIG. 3B illustrates using abstract interfaces and dynamic linking to provide a level of indirection.

Another technique for implementing indirection is the use of abstract interfaces and dynamic linking FIG. 3B illustrates using abstract interfaces and dynamic linking for a level of indirection. Compiler generated code can include a shader using an abstract interface for array/array_view buffer access (351). During runtime, code is checked for aliasing among runtime array/array_view parameters (361). Array access interface instances are bound to implementations corresponding to appropriate HLSL buffers (362).

When using abstract interfaces and dynamic binding, the compiler defines a HLSL buffer variable corresponding to each array parameter of the source kernel and an instance of an abstract interface for accessing each array parameter's underlying buffer. Additionally, concrete implementations of the array/array_view buffer access interface are generated corresponding to each HLSL buffer variable defined in the generated code. Each of the instances of the array/array_view buffer access interface in the generated code, is bound at runtime to an implementation corresponding to the appropriate HLSL buffer variable (depending on an aliasing check performed on the actual array/array_view parameters passed to the kernel at runtime).

At runtime (e.g., processor runtime 142), each actual array/array_view parameter is checked for read-write aliasing with other array/array_view parameters passed to the kernel. If aliasing is detected for that array/array_view, one of the writable arrays/array_views is picked from among the aliases and the corresponding HLSL buffer variable is bound to the underlying DirectX® buffer. Also, the array_buffer access interfaces for each of the aliased arrays/array_views are bound to the concrete implementation of the interface corresponding to the chosen HLSL buffer variable. The HLSL buffer variables corresponding to other aliased arrays/array_views are bound to NULL.

C++ extended for parallel environments provides the abstraction of a device buffer in the form of an "array" type. Instances of the "array" type are inputs and outputs of the code to be executed on a device and are passed as parameters to the device code at runtime. Each array instance provides access to a subset of the actual underlying physical DirectX buffer resource. When generating executable code for a C++ extended for parallel environments kernel function, a compiler defines buffer variables for each array parameter to the kernel in the generated executable code. However, since DirectX disallows binding the same DirectX buffer resource to multiple HLSL buffer variables if any of the HLSL buffer variables are writable, users are unable to pass array instances with the same underlying DirectX buffer resource as actual parameters to a kernel at runtime.

HLSL Dynamic Linking can be used for supporting buffer aliasing. For example, if a shader needs to access three buffers as:

```
RWStructuredBuffer<uint> _GV_buffer_rw_0: register(u0);
StructuredBuffer<uint>   _GV_buffer_ro_0: register(t0);
StructuredBuffer<uint>   _GV_buffer_ro_1: register(t1);
```

Instead of generating code to directly read/write the buffers, access is provided via two interfaces.

One interface abstracts the read-only buffer, the other abstracts the read-write buffer

```
interface ROBufferInterface {
    uint Load(uint idx);
};
interface RWBufferInterface {
    uint Load(uint idx);
    void Store(uint idx, uint val);
};
```

For a RWStructuredBuffer, two classes are generated, one implements the ROBufferinterface, and one implements the RWBufferinterface:

```
class BufferClass_0_RO : ROBufferInterface {
    uint Load(uint idx) {
        return _GV_buffer_rw_0[idx];
    }
```

-continued

```
};
class BufferClass_0_RW : RWBufferInterface {
    uint Load(uint idx) {
        return _GV_buffer_rw_0[idx];
    }
    void Store(uint idx, uint val) {
        _GV_buffer_rw_0[idx] = val;
    }
};
```

For a ROStructuredBuffer, one class is generated that implements the ROBufferinterface:

```
class BufferClass_1_RO : ROBufferInterface {
    uint Load(uint idx) {
        return _GV_buffer_ro_0[idx];
    }
};
class BufferClass_2_RO : ROBufferInterface {
    uint Load(uint idx) {
        return _GV_buffer_ro_1[idx];
    }
```

}; Instances of the interfaces are declared:
RWBufferinterface Buffer_0;
ROBufferinterface Buffer_1;
ROBufferinterface Buffer_2;
Other code accesses the buffer via Buffer_0, Buffer_1, and Buffer_2 instead of _GV_buffer_rw_0, _GV_buffer_ro_0, and _GV_buffer_ro_1.

When the runtime detects the aliased input, the runtime detects the corresponding shader. The runtime then configures binding the Buffer_x to an implementation of the interface. Table 1 depicts an example mapping between the various different elements:

TABLE 1

| Input/output Array | DirectX ® Buffer | HLSL Interface Instance | Runtime binding to a class |
|---|---|---|---|
| array 0 (RW) | Buf 0 | RWBufferInterface Buffer_0 | class BufferClass_0_RW |
| array 1 (RO) | Buf 1 | ROBufferInterface Buffer_1 | class BufferClass_1_RO |
| array 2 (RO) | Buf 0 | ROBufferInterface Buffer_2 | class BufferClass_0_RO |

As depicted in Table 1, array 0 and array 1 use the same underlying DirectX® buffer (Buf 0). This is an aliasing that runtime detects. The runtime then binds "array 2" to class BufferClass_0_RO. BufferClass_0_RO implements ROBufferinterface and uses _GV_buffer_rw_0 for "array 2". As a result, at runtime, _GV_buffer_rw_0 is used for both array 0 and array 2.

A compiler can determine each slot and make the slots available to a runtime for binding to an instance of a class.

Accordingly, embodiments of the inventions supporting buffer aliasing through introduction of a level of indirection between the source program's buffer accesses and the target executable physical buffers, and binding the logical buffer accesses to actual physical buffer accesses at runtime. A variety of techniques for can be used supporting runtime aliasing of buffers, in a system which otherwise disallows such runtime aliasing between separately defined buffers in the target executable code. Binding of logical buffer accesses in the source program to the actual physical buffers defined in the target executable code is delayed until runtime.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a plurality of processors and system memory, the plurality of processors including a first processor type and a second different processor type, the runtime environment for the second different processor type disallowing aliasing of physical data buffers, a method for aliasing a buffer, the method comprising:
    accessing a program, the program including source code configured for mixed execution on the first processor type and the second different processor type, the source code defining a physical buffer, the source code also including aliasing instructions for logically accessing the physical buffer through a plurality of logical views, each logical view corresponding to a subset of data in the physical buffer, at least one portion of the source code containing the aliasing instructions targeted for execution in the runtime environment for the second different processor type disallowing aliasing of physical data buffers;
    converting the at least one portion of source code into second code for the second different processor type, the second code defining a level of indirection between the logical buffer access and the physical buffer;
    configuring execution of the second code within the runtime environment of the second different processor type to bind logical buffer access to the physical buffer using the defined level of indirection; and
    using the defined level of indirection to bind the logical buffer access to the physical buffer during execution of the second code.

2. The method as recited in claim 1, wherein accessing a program comprises accessing a C++ program, the C++ being extended for parallel environments.

3. The method as recited in claim 1, wherein accessing a program comprises accessing a program configured for mixed execution in a Central Processing Unit ("CPU") runtime and a Graphical Processing Unit ("GPU") runtime.

4. The method as recited in claim 1, wherein accessing a program comprises accessing a program that includes instructions for logically accessing one of: Random Access Memory ("RAM") and virtual memory on a disk.

5. The method as recited in claim 1, wherein converting the at least one portion of source code into second code for the second different processor type comprises converting the at least portion of source into High Level Shader Language ("HLSL") code for execution on a Graphical Processing Unit ("GPU").

6. The method as recited in claim 1, further comprising:
    analyzing the second code to create a mapping between C++ extended for parallel environments array buffers and corresponding High Level Shader Language ("HLSL") buffer variables; and wherein
    using the defined level of indirection to bind the logical buffer access to the physical buffer comprises using the mapping to bind the logical buffer access to the physical buffer access.

7. The method as recited in claim 1, wherein converting the at least one portion of source code into second code for the second different processor type, the second code defining a level of indirection between the logical buffer access and the physical buffer comprises converting the at least one portion of source code to use dynamic tags to implement the level of indirection between the logical buffer access and the physical buffer.

8. The method as recited in claim 7, wherein using the defined level of indirection to bind the logical buffer access to the physical buffer during execution of the second code comprises using the dynamic tags to multiplex logical buffer access to appropriate physical buffer access.

9. The method as recited in claim 1, wherein converting the at least one portion of source code into second code for the second different processor type, the second code defining a level of indirection between the logical buffer access and the physical buffer comprises converting the at least one portion of source code to use abstract interfaces for logical buffer access.

10. The method as recited in claim 9, wherein using the defined level of indirection to bind the logical buffer access to the physical buffer during execution of the second code comprises dynamically linking to the physical buffer access during execution.

11. At a computer system including a plurality of processors and system memory, the plurality of processors including a first processor type and a second different processor type, the runtime environment for the second different processor type disallowing aliasing of physical data buffers, a method for aliasing a buffer, the method comprising:

accessing a program, the program including source code configured for mixed execution on the first processor type and the second different processor type, the source code defining a physical buffer, the source code also including aliasing instructions for logically accessing the physical buffer through a plurality of logical views, each logical view corresponding to a subset of data in the physical buffer, at least one portion of the source code containing the aliasing instructions targeted for execution in the runtime environment for the second different processor type disallowing aliasing of physical data buffers;

converting the at least one portion of source code into second code for the second different processor type, the second code defining dynamic tags that provide a level of indirection between the logical buffer access and the physical buffer access;

analyzing the second code to create a mapping between the logical buffer access and the physical buffer access;

configuring execution of the second code within the runtime environment of the second different processor type to bind logical buffer access to the physical buffer using dynamic tags; and using the dynamic tags to multiplex the logical buffer access to the physical buffer during execution of the second code.

12. The method as recited in claim 11, wherein accessing a program comprises accessing a C++ extended for parallel environments program.

13. The method as recited in claim 12, wherein converting the at least one portion of source code into second code for the second different processor type comprises converting the at least portion of source into High Level Shader Language ("HLSL") code for execution on a Graphical Processing Unit ("GPU").

14. The method as recited in claim 11, wherein accessing a program comprises accessing a program configured for mixed execution in a Central Processing Unit ("CPU") runtime and a Graphical Processing Unit ("GPU") runtime.

15. The method as recited in claim 11, wherein accessing a program comprises accessing a program that includes instructions for logically accessing one of: Random Access Memory ("RAM") and virtual memory on a disk.

16. At a computer system including a plurality of processors and system memory, the plurality of processors including a first processor type and a second different processor type, the runtime environment for the second different processor type disallowing aliasing of physical data buffers, a method for aliasing a buffer, the method comprising:

accessing a program, the program including source code configured for mixed execution on the first processor type and the second different processor type, the source code defining a physical buffer, the source code also including aliasing instructions for logically accessing the physical buffer through a plurality of logical views, each logical view corresponding to a subset of data in the physical buffer, at least one portion of the source code containing the aliasing instructions targeted for execution in the runtime environment for the second different processor type disallowing aliasing of physical data buffers;

converting the at least one portion of source code into second code for the second different processor type, the second code defining an abstract interface that provides a level of indirection between the logical buffer access and the physical buffer access;

configuring execution of the second code within the runtime environment of the second different processor type to bind logical buffer access to the physical buffer using a concrete implementation of the defined abstract interface; and dynamically linking the abstract interface to the concrete implementation during execution of the second code to facilitate physical buffer access.

17. The method as recited in claim 16, wherein accessing a program comprises accessing a C++ extended for parallel environments program.

18. The method as recited in claim 17, wherein converting the at least one portion of source code into second code for the second different processor type comprises converting the at least portion of source into High Level Shader Language ("HLSL") code for execution on a Graphical Processing Unit ("GPU").

19. The method as recited in claim 16, wherein accessing a program comprises accessing a program configured for mixed execution in a Central Processing Unit ("CPU") runtime and a Graphical Processing Unit ("GPU") runtime.

20. The method as recited in claim 16, wherein accessing a program comprises accessing a program that includes instructions for logically accessing one of: Random Access Memory ("RAM") and virtual memory on a disk.

* * * * *